US010160482B2

(12) United States Patent
Endo

(10) Patent No.: US 10,160,482 B2
(45) Date of Patent: Dec. 25, 2018

(54) DRIVING SUPPORT CONTROL APPARATUS USING ELECTRIC POWER STEERING MECHANISM

(71) Applicant: NSK LTD., Tokyo (JP)

(72) Inventor: Shuji Endo, Maebashi (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/544,978

(22) PCT Filed: Jun. 23, 2016

(86) PCT No.: PCT/JP2016/068637
§ 371 (c)(1),
(2) Date: Jul. 20, 2017

(87) PCT Pub. No.: WO2016/208665
PCT Pub. Date: Dec. 29, 2016

(65) Prior Publication Data
US 2018/0111642 A1 Apr. 26, 2018

(30) Foreign Application Priority Data

Jun. 26, 2015 (JP) ................. 2015-128761

(51) Int. Cl.
*B62D 5/04* (2006.01)
*B62D 6/00* (2006.01)
(52) U.S. Cl.
CPC ......... *B62D 5/0472* (2013.01); *B62D 5/0463* (2013.01); *B62D 6/008* (2013.01)
(58) Field of Classification Search
CPC ..... B62D 5/0472; B62D 5/0463; B62D 6/008
(Continued)

(56) References Cited

U.S. PATENT DOCUMENTS

2010/0168963 A1 7/2010 Yamamoto
2010/0280715 A1* 11/2010 Kobayashi ........... B62D 5/0463
701/41
(Continued)

FOREIGN PATENT DOCUMENTS

JP 8-67267 A 3/1996
JP 2007-302017 A 11/2007
(Continued)

OTHER PUBLICATIONS

International Search Report for PCT/JP2016/068637 dated Aug. 23, 2016 [PCT/ISA/210].
(Continued)

*Primary Examiner* — Isaac G Smith
(74) *Attorney, Agent, or Firm* — Sughrue Mion, PLLC

(57) ABSTRACT

A driving support control apparatus using an electric power steering mechanism that improves followability to a target track and safety of steering operation by adapting information of a steering torque to a driver's characteristic on the basis of conditions for enhancing predictability of a vehicle track. The driving support control apparatus includes: a SAT estimating section that estimates a self-aligning torque; a SAT transfer characteristic control section that corrects the self-aligning torque in order to make a time constant of a self-aligning torque transfer characteristic equal to a desired value, and compensates the steering torque; a disturbance sensitivity control section that suppresses a disturbance included by the self-aligning torque, and compensates the steering torque; and a vehicle characteristic compensation control section that compensates the steering torque in accordance with an actual steering angle so that a vehicle characteristic becomes a primary delay characteristic.

19 Claims, 9 Drawing Sheets

(58) Field of Classification Search
USPC .......................................................... 701/41
See application file for complete search history.

(56) References Cited

U.S. PATENT DOCUMENTS

2013/0245890 A1* 9/2013 Kageyama ............... B62D 7/18
 701/41
2015/0291210 A1* 10/2015 Kageyama ............ B60T 8/1755
 701/41

FOREIGN PATENT DOCUMENTS

| JP | 2008-18825 A | 1/2008 |
| JP | 5291640 B2 | 9/2013 |

OTHER PUBLICATIONS

Written Opinion for PCT/JP2016/068637 dated Aug. 23, 2016 [PCT/ISA/237].

* cited by examiner

DRIVING SUPPORT CONTROL APPARATUS USING ELECTRIC POWER STEERING MECHANISM

CROSS REFERENCE TO RELATED APPLICATIONS

This application is a National Stage of International Application No. PCT/JP2016/068637 filed Jun. 23, 2016, claiming priority based on Japanese Patent Application No. 2015-128761 filed Jun. 26, 2015, the contents of all of which are incorporated herein by reference in their entirety.

TECHNICAL FIELD

The present invention relates to a driving support control apparatus using an electric power steering mechanism that drives a motor on the basis of a current command value, and assists and controls a steering system, and in particular to a driving support control apparatus using an electric power steering mechanism that improves followability of a vehicle track to a target track which a driver recognizes.

BACKGROUND ART

An electric power steering apparatus (EPS) which assists and control a steering system of a vehicle by means of a rotational torque of a motor, applies a driving force of the motor as a steering assist torque (an assist torque) to a steering shaft or a rack shaft by means of a transmission mechanism such as gears or a belt through a reduction mechanism. In order to accurately generate the steering assist torque, such a conventional electric power steering apparatus performs feedback control of a motor current. The feedback control adjusts a voltage supplied to the motor so that a difference between a current command value and a detected motor current value becomes small, and the adjustment of the voltage supplied to the motor is generally performed by an adjustment of a duty ratio of pulse width modulation (PWM) control.

A general configuration of the conventional electric power steering apparatus will be described with reference to FIG. 1. As shown in FIG. 1, a column shaft (a steering shaft or a handle shaft) 2 connected to a steering wheel 1 is connected to steered wheels 8L and 8R through reduction gears 3, universal joints 4a and 4b, a rack-and-pinion mechanism 5, and tie rods 6a and 6b, further via hub units 7a and 7b. In addition, the column shaft 2 is provided with a torque sensor 10 for detecting a steering torque of the steering wheel 1 and a steering angle sensor 14 for detecting a steering angle θ, and a motor 20 for assisting a steering force of the steering wheel 1 is connected to the column shaft 2 through the reduction gears 3. The electric power is supplied to a control unit (ECU) 30 for controlling the electric power steering apparatus from a battery 13, and an ignition key (IG) signal is inputted into the control unit 30 through an ignition key 11. The control unit 30 calculates a current command value of an assist (steering assist) command on the basis of a steering torque Ts detected by the torque sensor 10 and a vehicle speed V detected by a vehicle speed sensor 12, and controls a current supplied to the motor 20 for the EPS by means of a voltage control command value Vref obtained by performing compensation or the like to the current command value.

Moreover, the steering angle sensor 14 is not essential, it does not need to be provided, and it is possible to obtain the steering angle from a rotation sensor such as a resolver connected to the motor 20.

A controller area network (CAN) 100 exchanging various information of a vehicle is connected to the control unit 30, and it is possible to receive the vehicle speed V from the CAN 100. Further, it is also possible to connect a non-CAN 101 exchanging a communication, analog/digital signals, a radio wave or the like except with the CAN 100 to the control unit 30.

The control unit 30 mainly comprises an MCU (including a CPU, an MPU and so on), and general functions performed by programs within the MCU are shown in FIG. 2.

Functions and operations of the control unit 30 will be described with reference to FIG. 2. As shown in FIG. 2, the steering torque Ts detected by the torque sensor 10 and the vehicle speed V detected by the vehicle speed sensor 12 (or from the CAN 100) are inputted into a current command value calculating section 31 that calculates a current command value Iref1. The current command value calculating section 31 calculates the current command value Iref1 that is a control target value of a motor current supplied to the motor 20 on the basis of the steering torque Ts and the vehicle speed V inputted and by using an assist map or the like. The current command value Iref1 is inputted into a current limiting section 33 through an adding section 32A. A current command value Irefm the maximum current of which is limited is inputted into a subtracting section 32B, and a deviation ΔI (=Irefm−Im) between the current command value Irefm and a motor current value Im being fed back is calculated. The deviation ΔI is inputted into a proportional integral (PI) control section 35 for improving a characteristic of the steering operation. The voltage control command value Vref whose characteristic is improved by the PI-control section 35 is inputted into a PWM-control section 36. Furthermore, the motor 20 is PWM-driven through an inverter 37 serving as a driving section. The motor current value Im of the motor 20 is detected by a motor current detector 38 and is fed back to the subtracting section 32B. The inverter 37 uses field effect transistors (FETs) as driving elements and is comprised of a bridge circuit of FETs.

A compensation signal CM from a compensation signal generating section 34 is added to the adding section 32A, and a characteristic compensation of the steering system is performed by the addition of the compensation signal CM so as to improve a convergence, an inertia characteristic and so on. The compensation signal generating section 34 adds a self-aligning torque (SAT) 34-3 and an inertia 34-2 in an adding section 34-4, further adds the result of addition performed in the adding section 34-4 with a convergence 34-1 in an adding section 34-5, and then outputs the result of addition performed in the adding section 34-5 as the compensation signal CM.

It is possible to position such an electric power steering apparatus as a driving support control apparatus and utilize it for supporting steering operation. The steering operation is making a vehicle track follow a target track which a driver recognizes, and safety of the steering operation can be defined as a state where a following error is within an acceptable range. In order to improve the safety of the steering operation, prediction of the vehicle track by the driver is important, and the driving support control apparatus is required to support the steering operation to improve this predictability.

In such a view, apparatuses that support driver's steering operation have been proposed. For example, the publication of Japanese Patent No. 5291640 B2 (Patent Document 1) improves a sense of unity between a vehicle and a driver, operability and so on by setting a characteristic of a yaw rate for a steering angle of a steering wheel and matching a direction of a reference position of the steering wheel with a direction of a target arrival point after a front steadily gazing time. That is, it performs control so as to match the steering angle of the steering wheel with a curvature of a target track and so that a vehicle characteristic observed by the driver becomes a neutral steering characteristic.

THE LIST OF PRIOR ART DOCUMENTS

Patent Documents

Patent Document 1: Japanese Patent No. 5291640 B2

SUMMARY OF THE INVENTION

Problems to be Solved by the Invention

However, in order to perform desired control, the apparatus disclosed in Patent Document 1 needs to cut a mechanical link between wheels and the steering wheel, is a useful driving support technique to a luxury vehicle equipped with a steering gear ratio variable mechanism, a steer-by-wire (SBW) mechanism or the like, but is difficult to be applied to a general vehicle equipped with an electric power steering apparatus.

The present invention has been developed in view of the above-described circumstances. On the assumption that an electric power steering apparatus is utilized, the object of the present invention is to provide a driving support control apparatus using an electric power steering mechanism that improves the followability to the target track and safety of the steering operation by adapting information of a steering torque to a driver's characteristic on the basis of conditions for enhancing predictability of the vehicle track.

Means for Solving the Problems

The present invention relates to a driving support control apparatus using an electric power steering mechanism that calculates a current command value based on at least a steering torque, drives a motor based on the current command value, and assists and controls a steering system, the above-described object of the present invention is achieved by that comprising: a SAT estimating section that estimates a self-aligning torque; a SAT transfer characteristic control section that corrects the self-aligning torque in order to make a time constant of a self-aligning torque transfer characteristic equal to a desired value, compensates the steering torque in accordance with a corrected self-aligning torque, and outputs a compensated steering torque as a first compensated steering torque; a disturbance sensitivity control section that suppresses a disturbance included by the self-aligning torque, compensates the first compensated steering torque in accordance with a self-aligning torque obtained by suppressing the disturbance, and outputs a compensated first compensated steering torque as a second compensated steering torque; and a vehicle characteristic compensation control section that compensates the second compensated steering torque in accordance with an actual steering angle that is detected so that a vehicle characteristic from the actual steering angle to a yaw rate becomes a primary delay characteristic.

The above-described object of the present invention is more effectively achieved by that wherein the vehicle characteristic compensation control section compensates the second compensated steering torque by using a characteristic Cf(s) providing the vehicle characteristic with damping, and the characteristic Cf(s) has been adjusted so that a damping factor of the yaw rate changing depending on a natural frequency of the electric power steering mechanism approximates a highest damping factor; or wherein the characteristic Cf(s) has been adjusted so that the damping factor of the yaw rate is about 0.8 and a yaw rate natural frequency is between about 2 Hz and about 4 Hz; or wherein the SAT transfer characteristic control section is configured as a disturbance observer; or wherein the SAT transfer characteristic control section compensates the steering torque by using a transfer characteristic defined by the desired time constant; or wherein the disturbance sensitivity control section comprises a controller for each disturbance that is suppressed; or wherein one of the disturbances that the disturbance sensitivity control section suppresses is a small-amplitude disturbance occurring by a small-amplitude torque vibration, and the controller for the small-amplitude disturbance is configured as a structural damping model; or wherein one of the disturbances that the disturbance sensitivity control section suppresses is a resonance point disturbance excited at a resonance point in a longitudinal direction of a suspension, and the controller for the resonance point disturbance is configured as a disturbance observer; or wherein one of the disturbances that the disturbance sensitivity control section suppresses is a cant disturbance occurring by a road cant, and the controller for the cant disturbance performs detection of a straight running state of a vehicle and a offset correction of the self-aligning torque.

Effects of the Invention

The driving support control apparatus using the electric power steering mechanism enables improvement of followability to a target track and safety of steering operation by configuring the control sections on the basis of the conditions for enhancing predictability of a vehicle track, and adapting information of a steering torque to a driver's characteristic.

MODE FOR CARRYING OUT THE INVENTION

The present invention adapts information of a steering torque to a driver's characteristic on the basis of conditions for enhancing predictability of a vehicle track (hereinafter referred to "prediction enhancement conditions"). Since it is supposed to use the information of the steering torque in addition to conventional visual information in the prediction of the vehicle track, the present invention targets the information of the steering torque. The following are enumerated as the prediction enhancement conditions: "to be capable of simplifying a vehicle characteristic observed by the driver to a primary delay characteristic" (hereinafter referred to a "first condition"), "that a time constant of a transfer characteristic of a steering torque to a yaw rate is within an appropriate range" (hereinafter referred to a "second condition"), and "to be capable of controlling sensitivity of a prediction error of the vehicle track to a disturbance so as to be within an acceptable range of the driver" (hereinafter referred to a "third condition").

Hereinafter, each condition will be described.

First, the first condition will be described.

It is generally known that a week understeer characteristic is desirable as the vehicle characteristic with respect to steering operation. A damping factor of the week understeer characteristic is about 0.8. The characteristic whose damping factor is 0.8 is a good characteristic in both the steering time when the driver steers a vehicle intentionally and the steered time when a vehicle is steered by a disturbance because lateral displacement for a disturbance such as a side wind is modified by the characteristic a little overshooting. It is possible to treat the week understeer characteristic as a characteristic approximating a primary delay characteristic whose damping factor is 1, so that if the vehicle characteristic can be simplified to the primary delay characteristic, a steering feeling becomes good, and it is also possible to enhance the predictability of the vehicle track. The first condition is derived from this. Here, the vehicle characteristic is defined as a transfer characteristic from an actual steering angle to a yaw rate.

Next, the second condition will be described.

When deriving a characteristic from the steering torque to the yaw rate on the assumption that information of the yaw rate which is estimated by the information of the steering torque is used in the prediction of the vehicle track, and that the first condition is established, a transfer characteristic D(s) of that characteristic is the following expression 1.

$$D(s) = \frac{G_r C_s}{\tau_r s + 1} \quad \text{[Expression 1]}$$

Figure 3:
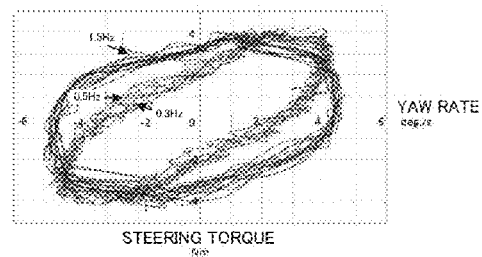
FIG. 3 is a characteristic diagram showing a result obtained by measuring a yaw rate characteristic to a steering torque of a vehicle having a weak understeer characteristic.

$G_r$ is a yaw rate gain, $C_s$ is a compliance characteristic, $\tau_r$ is a response time constant of the yaw rate, and s is a Laplace operator. Here, the characteristic expressed by the expression 1 will be analyzed. FIG. 3 shows a result obtained by measuring a yaw rate characteristic to a steering torque of a vehicle that is evaluated to have a weak understeer characteristic and a good steering feeling. The vertical axis shows the steering torque, the horizontal axis shows the yaw rate, and the results are shown in the cases that a steering input frequency is 0.3 Hz corresponding to a normal operation, 0.5 Hz corresponding to a little rapid lane change, and 1.5 Hz more than them. In this measurement, an assist torque occurs from the steering torque of about 2 Nm (newton meter). From FIG. 3, it is found out that the yaw rate is almost proportional to the steering torque and there is no change by the frequency at 0.3 Hz and 0.5 Hz where the steering input frequency is less than or equal to a yaw rate natural frequency. An elliptical shape by phase delay and a decrease in a gain are found out at 1.5 Hz where the steering input frequency is more than or equal to the yaw rate natural frequency. Therefore, the characteristic expressed by the expression 1 where a delay characteristic occurs around 1.5 Hz is considered to almost correspond to the characteristic shown in FIG. 3. Further, since the vehicle having the characteristic shown in FIG. 3 is evaluated to have a sense of unity in steering, an appropriate setting on the time constant of the transfer characteristic of the steering torque to the yaw rate enables the steering with the sense of unity and enhancement of the predictability of the vehicle track. The second condition is derived from this. Moreover, the yaw rate natural frequency of the vehicle is a vibration frequency of free vibration of a steering wheel occurring without a motor of an electric power steering apparatus. The transfer characteristic of the steering torque to the yaw rate can be derived by performing a frequency sweep (a change of a frequency at a constant rate) and measuring the steering torque corresponding to the yaw rate at that time.

Finally, the third condition will be described.

In the case that a factor of error of the vehicle track to the target track is a disturbance, the disturbance includes information of a driving environment that is necessary for safety in steering operation. Therefore, the driver needs to recognize the disturbance as the information and control it so that the followability to the target track is not inhibited. Further, since information transfer relating to vehicle behavior and reduction of sensitivity to the disturbance are in the relation of trade-off, the third condition is derived based on these.

With respect to the above three conditions (the first condition, the second condition and the third condition), the present invention comprises sections having functions performed to satisfy each condition. Specifically, a vehicle characteristic compensation control section for the first condition, a SAT transfer characteristic control section for the second condition, and a disturbance sensitivity control section for the third condition perform processings respectively to satisfy the conditions. Each section performs the processing to adapt the information of the steering torque to a driver's characteristic. The processings are performed to the detected steering torque in the order of the SAT transfer characteristic control section, the disturbance sensitivity control section, and the vehicle characteristic compensation control section.

Thus, it is possible to improve the followability to the target track and enhance the safety of steering operation by compensating the detected steering torque by using the functions performed to satisfy the prediction enhancement conditions derived from the importance of the prediction of vehicle track using the information of the steering torque.

Hereinafter, an embodiment of the present invention will be described with reference to the accompanying drawings.

Figure 1:
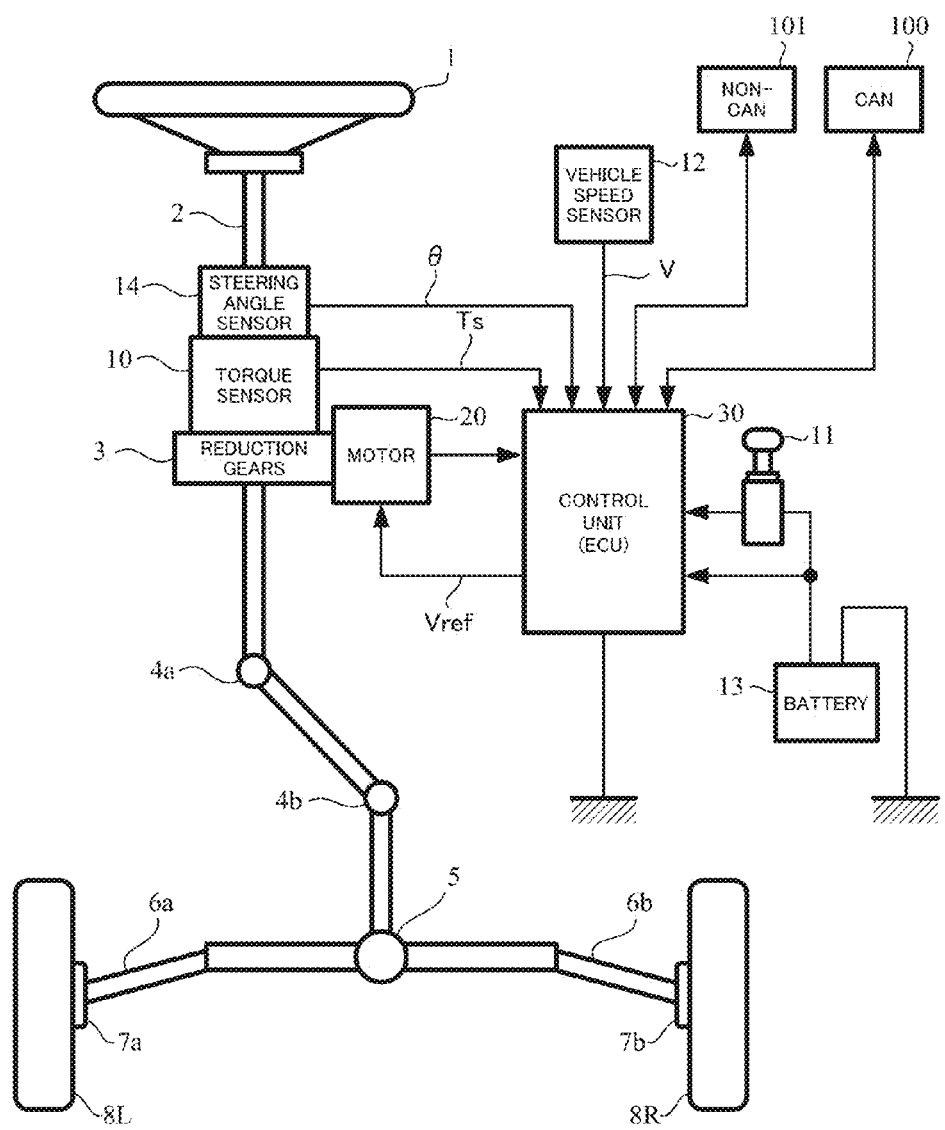
FIG. 1 is a configuration diagram illustrating a general outline of an electric power steering apparatus.
Figure 2:
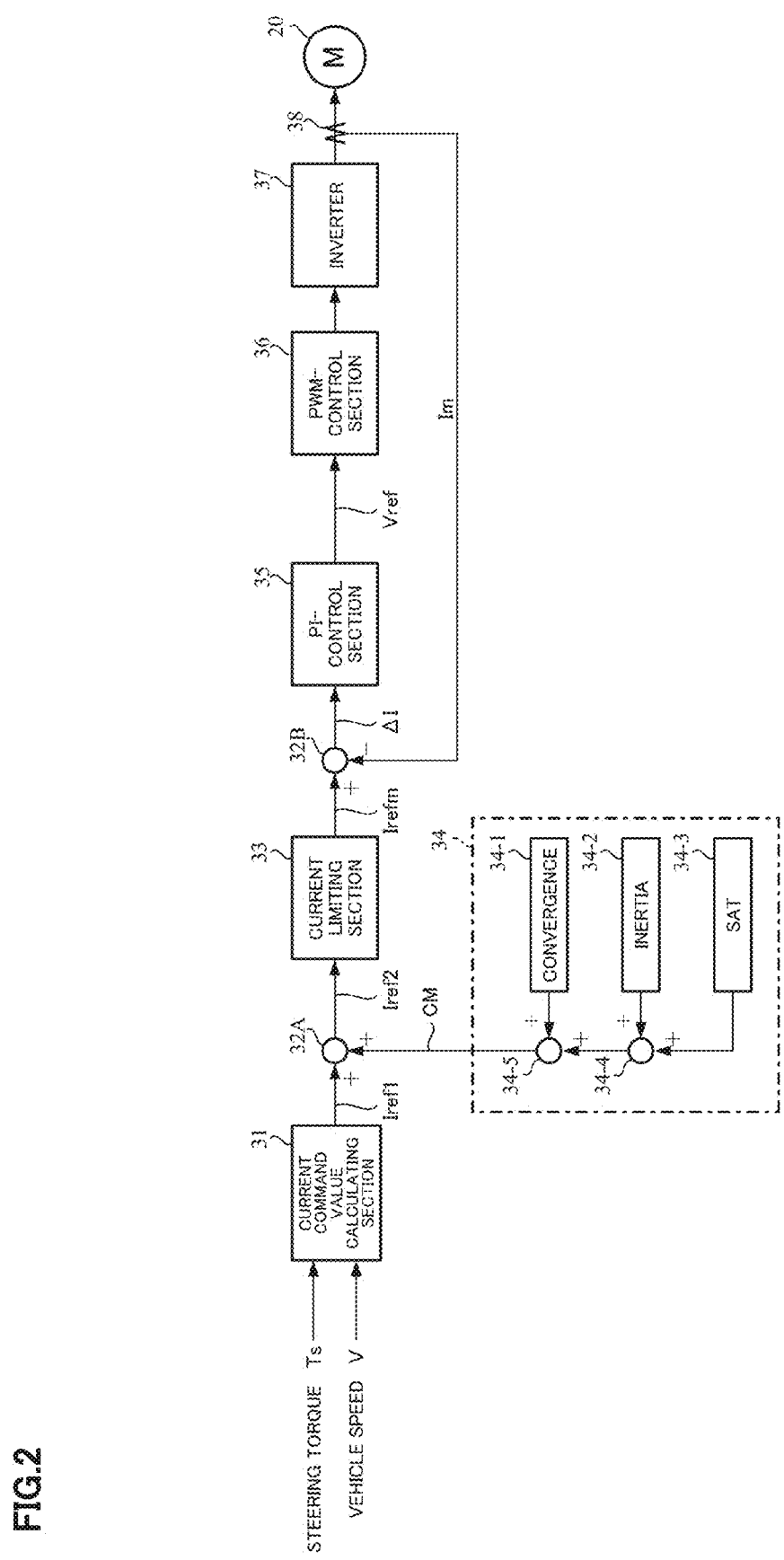
FIG. 2 is a block diagram showing a configuration example of a control unit (ECU) of the electric power steering apparatus.
Figure 4:
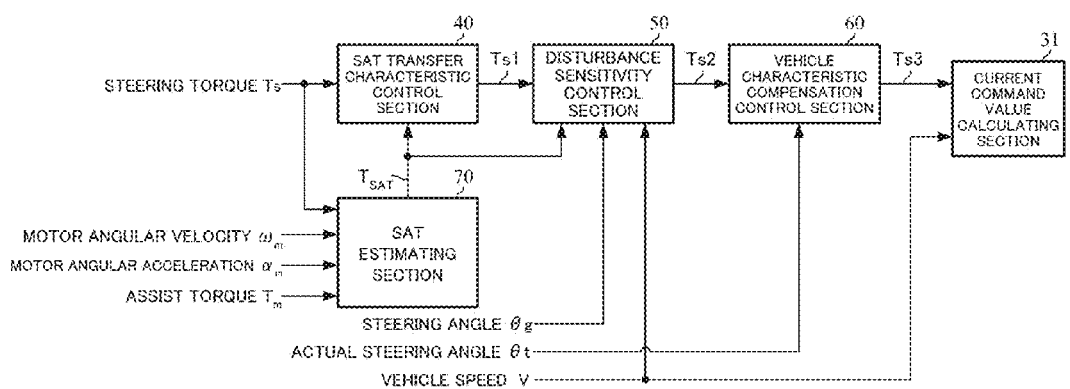
FIG. 4 is a block diagram showing a configuration example of the present invention.

FIG. 4 shows a configuration example of the embodiment of the present invention. Since a configuration of a current command value calculating section 31 is the same as a current command value calculating section 31 shown in FIG. 2, the explanation is omitted. Further, a configuration after the current command value calculating section 31 are the same as the configuration shown in FIG. 2, and operations after that are the same as the above operations.

A SAT estimating section 70 estimates a self-aligning torque (SAT) $T_{SAT}$ by a steering torque Ts, an assist torque Tm, a motor angular velocity ωm, and a motor angular acceleration am. A SAT transfer characteristic control section 40 compensates the steering torque Ts on the basis of the estimated SAT $T_{SAT}$ so as to satisfy the second condition, and outputs a compensated steering torque Ts1. A disturbance sensitivity control section 50 compensates the compensated steering torque Ts1 on the basis of the estimated SAT $T_{SAT}$, a steering angle θg, and a vehicle speed V so as to satisfy the third condition, and outputs a compensated steering torque Ts2. A vehicle characteristic compensation control section 60 compensates the compensated steering torque Ts2 on the basis of an actual steering angle θt so as to satisfy the first condition, and outputs a compensated steering torque Ts3 to the current command value calculating section 31.

Each section will be described in detail.

What is shown in the publication of Japanese Patent No. 4192442 B2, for example, can be adapted to the SAT estimating section 70. Its outline will be described.

Figure 5:
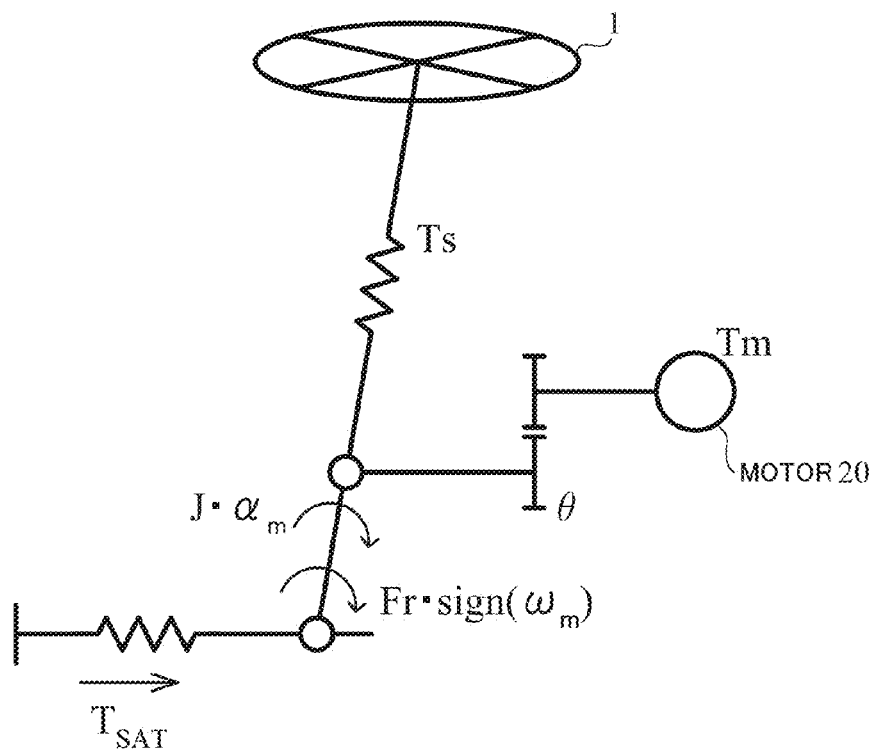
FIG. 5 is an image diagram showing a state of a torque occurring between a road surface and a steering.

A state of a torque occurring between a road surface and a steering is as shown in FIG. 5. The steering torque Ts occurs by a driver steering a steering wheel, and a motor generates the assist torque Tm according to the steering torque Ts. As the result, wheels are turned, and a SAT occurs as a reaction force. At that time, a torque which becomes resistance to steering of the steering wheel occurs by an inertia J and a friction (a static friction) Fr of the motor. A motion equation as the following expression 2 is obtained from a balance of these forces.

$$J \cdot \alpha_m + Fr \, \text{sign}(\omega_m) + T_{SAT} = T_m + T_s \quad \text{[Expression 2]}$$

Here, the following expression 3 is obtained by Laplace transforming the above expression 2 with the initial value equal to zero and solving it for the $T_{SAT}$.

$$T_{SAT}(s) = T_m(s) + T_s(s) - J \cdot \alpha_m(s) + Fr \, \text{sign}(\omega_m(s)) \quad \text{[Expression 3]}$$

As known from the above expression 3, it is possible to estimate the SAT $T_{SAT}$ in accordance with the motor angular velocity ωm, the motor angular acceleration am, the assist torque Tm, and the steering torque Ts by previously obtaining the inertia J and the static friction Fr of the motor as constants.

Moreover, when the estimated SAT is fed back as it is, the steering becomes too heavy, and there are cases where a steering feeling cannot be improved, so that it is possible to perform signal processing with respect to the SAT $T_{SAT}$ by using a filter having a frequency characteristic and output only necessary and sufficient information for improving the steering feeling. Further, it is possible to estimate the SAT by means of a method other than the present method.

Next, the vehicle characteristic compensation control section 60 will be described.

The first condition targeted by the vehicle characteristic compensation control section 60 is a condition relating to the vehicle characteristic. The vehicle characteristic is defined as a transfer characteristic from an actual steering torque to a yaw rate. The transfer characteristic from the actual steering torque et to the yaw rate r in a two-wheel model is expressed as the following expression 4.

$$r(s) = G_0 \frac{\tau_r s + 1}{\frac{s^2}{\omega_n^2} + \frac{2\xi s}{\omega_n} + 1} \theta_t(s) \quad \text{[Expression 4]}$$

$$\omega_n = \frac{2L}{V} \sqrt{\frac{K_f K_r}{mI}} \sqrt{1 + KV^2} \quad \text{[Expression 5]}$$

$$\xi = \frac{m(L_f^2 K_f + L_r^2 K_r) + I(K_f + K_r)}{2L\sqrt{mI K_f K_r (1 + KV^2)}} \quad \text{[Expression 6]}$$

$$K = -\frac{m}{2L^2} \frac{L_f K_f - L_r K_r}{K_f K_r} \quad \text{[Expression 7]}$$

$G_0$ is a gain, $\tau_r$ is a time constant of the yaw rate, $\xi$ is a damping factor of the yaw rate, $\omega_n$ is a yaw rate natural frequency, L is a wheel base, Kf is a cornering power of a front wheel, Kr is a cornering power of a rear wheel, m is a vehicle weight, I is a yaw inertia moment of a vehicle, Lf is a distance between centroid points of a front axle, and Lr is a distance between centroid points of a rear axle.

Figure 6:
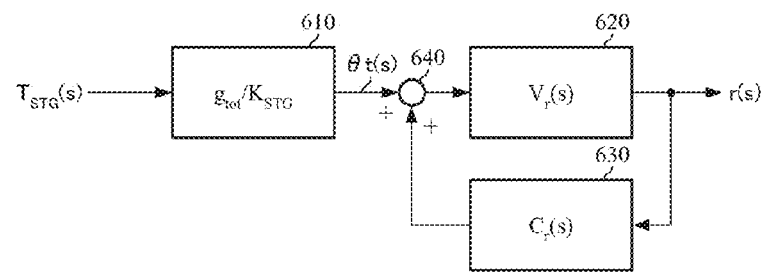
FIG. 6 is a block diagram showing a configuration in the case of simplifying a vehicle characteristic to a primary delay characteristic by feedback of a yaw rate.

With respect to this vehicle characteristic, for example, when simplifying it to a primary delay characteristic on the basis of a damping factor, it is necessary to detect a change rate of the yaw rate and feed back it. What represent this as a block diagram is as shown in FIG. 6. In FIG. 6, $T_{STG}$ is a steering torque, $g_{tot}$ is a total gear ratio, $K_{STG}$ is a constant, Vr(s) is a vehicle characteristic, and Cr(s) is a feedback characteristic. The configuration comprises a gain section 610 where $g_{tot}/K_{STG}$ is a gain, a characteristic section 620 having the Vr(s), a characteristic section 630 having the Cr(s), and an adding section 640.

Figure 7:
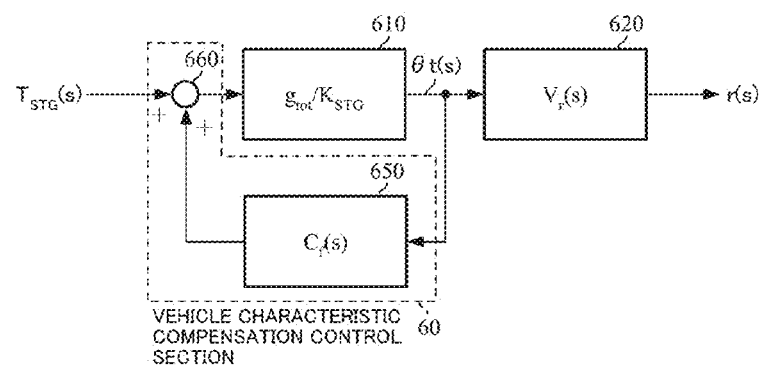
FIG. 7 is a block diagram showing a configuration in the case of performing the same control as performed by the configuration shown in FIG. 6 by feedback of an actual steering angle.

However, an electric power steering apparatus cannot directly detect the yaw rate, what the electric power steering apparatus can detect is an actual steering angle, and what it outputs is an assist torque. Therefore, in order to perform control equivalent to performed by the configuration shown in FIG. 6 using an electric power steering mechanism, it is necessary in the configuration shown in FIG. 7 to design a characteristic section 650 having a characteristic Cf(s) that makes the configuration equivalent to shown in FIG. 6. A transfer characteristic of the configuration shown in FIG. 6 and a transfer characteristic of the configuration shown in FIG. 7 are the following expression 8 and expression 9 respectively, and the characteristic Cf(s) that makes the expression 9 equivalent to the expression 8 is given by the following expression 10.

$$\frac{r(s)}{T_{STG}(s)} = \frac{g_{tot}}{K_{STG}} \frac{V_r(s)}{1 - V_r(s) C_r(s)} \quad \text{[Expression 8]}$$

-continued $$\frac{r(s)}{T_{STG}(s)} = \frac{g_{tot}}{K_{STG}} \frac{V_r(s)}{1 - \frac{g_{tot}}{K_{STG}} C_f(s)}$$ [Expression 9]

$$C_f(s) = \frac{K_{STG}}{g_{tot}} V_r(s) C_r(s)$$ [Expression 10]

Since such a necessary condition as to approximate the vehicle characteristic to a primary delay characteristic is ξ≈1, a driving support function that makes ξ≈1 is needed. Damping is given to the yaw rate for that. In FIG. 6, a transfer characteristic from the actual steering angle θt to the yaw rate r, that is, the vehicle characteristic becomes the following expression 12 by expressing Cr(s) with the following expression 11 and substituting it for the expression 4, and the damping is given.

$$C_r(s) = \frac{K_d s}{\tau_r s + 1} \frac{1}{\omega_n}$$ [Expression 11]

$$r(s) = G_0 \frac{\tau_r s + 1}{\frac{s^2}{\omega_n^2} + \frac{(2\xi + G_0 K_d)}{\omega_n} s + 1} \theta_t(s)$$ [Expression 12]

$K_d$ is an adjustment gain. From the expression 10 and the expression 12, the equivalent characteristic Cf(s) is obtained as the following expression 13.

$$C_f(s) = G_0 \frac{K_{STG}}{g_{tot}} \frac{K_d s}{\frac{s^2}{\omega_n^2} + \frac{(2\xi + G_0 K_d)}{\omega_n} s + 1}$$ [Expression 13]

It is possible to give the damping to the yaw rate by using the characteristic Cf(s). However, it is necessary to consider a steering characteristic since an actual yaw rate characteristic appears as a coupling characteristic obtained by serially coupling the yaw rate characteristic and the steering characteristic of the vehicle. That is, the damping factor of the yaw rate changes depending on a natural frequency of the electric power steering mechanism forming the steering characteristic, so that it is necessary to adjust the characteristic Cf(s) considering this change. Specifically, the characteristic Cf(s) is adjusted so that a natural frequency $\omega_{STG}$ of the electric power steering mechanism approaches to a value of the following expression 14 that makes the damping factor of the yaw rate highest.

$$\omega_{STG} \approx \sqrt{\frac{1}{\tau_{SAT}} \frac{1}{\tau_r}}$$ [Expression 14]

$\tau_{SAT}$ is a time constant of a self-aligning torque transfer characteristic. Moreover, the natural frequency $\omega_{STG}$ is a vibration frequency measured in the case of performing impulse steering (an operation of rapidly turning a steering wheel for a moment) and free vibration.

As described above, an appropriate value of the damping factor of the yaw rate is about 0.8. Further, an upper limit of a frequency (change rate) of the yaw rate that a driver can control is about 2 Hz, and the yaw rate natural frequency is desirable to be from about 2 Hz to about 4 Hz considering responsiveness of the vehicle that supposes emergency steering. In the case that the yaw rate natural frequency is from about 0.4 Hz to about 2 Hz, the driver can control it. The characteristic Cf (s) is adjusted on the basis of these. Specifically, it is adjusted, for example, so that a pole of the steering characteristic is stable and less than or equal to about 2 Hz. Moreover, control of the yaw rate is possible in the case that the yaw rate natural frequency is less than or equal to about 0.4 Hz, and the yaw rate is made proportional to the steering torque so as to control the yaw rate by the steering torque. Since this is observed in the characteristic shown in FIG. 3 as described above, it can be achieved by satisfying the second condition.

The vehicle characteristic compensation control section 60 comprises the characteristic section 650 and an adding section 660 that are enclosed with a broken line in FIG. 7. The characteristic section 650 has the characteristic Cf(s) expressed by the expression 13, and transforms the actual steering angle θt by using the characteristic Cf(s). Further, parameters of the characteristic Cf(s) are adjusted so as to satisfy the expression 14.

Next, the SAT transfer characteristic control section 40 will be described.

A content of the second condition that the SAT transfer characteristic control section 40 targets is that the time constant of the transfer characteristic of the steering torque to the yaw rate is within an appropriate range as described above. With respect to the yaw rate and the steering torque relating to this condition, the relation between the two changes in accordance with the steering input frequency, however, since the vehicle that is evaluated to have the weak understeer characteristic and a good steering feeling has almost the same characteristic at the steering input frequencies of 0.3 Hz and 0.5 Hz as shown in FIG. 3, the vehicle track is considered to be easy to predict for the driver. Therefore, such a characteristic can be achieved by a vehicle having an understeer characteristic. To do so, the following are necessary: "to set the yaw rate natural frequency of the vehicle high", "to compensate an influence of the time constant $\tau_{SAT}$ of the self-aligning torque transfer characteristic by the steering characteristic", etc. Of these, since compensation of the influence of the $\tau_{SAT}$ can be achieved by the electric power steering mechanism, the SAT transfer characteristic control section 40 deals with this.

The present embodiment configures the SAT transfer characteristic control section 40 as a disturbance observer. It is because the electric power steering mechanism having a feedback control system can easily obtain a disturbance torque by means of the disturbance observer being an input error model by regarding the SAT as a disturbance.

Figure 8:
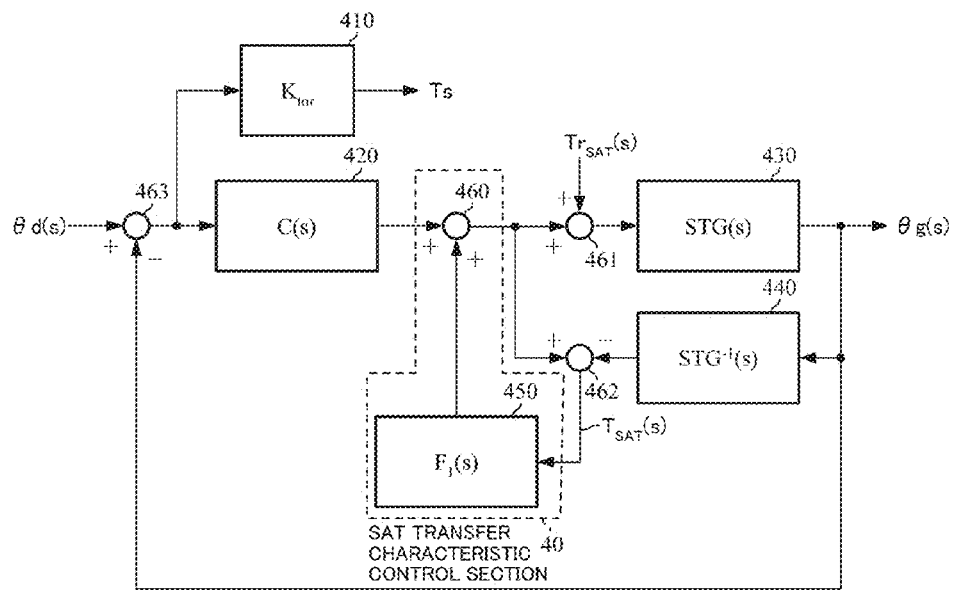
FIG. 8 is a block diagram in the case of configuring a SAT transfer characteristic control section as a disturbance observer.

FIG. 8 is a block diagram in the case of configuring the SAT transfer characteristic control section 40 as the disturbance observer. In FIG. 8, θd is a steering angle, $Tr_{SAT}$ is an actual SAT, $K_{tor}$ is a torsion bar rigidity, C(s) is a characteristic of a control system including a torsion bar, STG(s) is a steering characteristic, and $F_1(s)$ is a filter characteristic. The configuration comprises a gain section 410 where the $K_{tor}$ is a gain, a characteristic section 420 having the C(s), a characteristic section 430 having the STG(s), a characteristic section 440 having a $STG^{-1}(s)$, a filter 450 having the $F_1(s)$, adding sections 460 and 461, and subtracting sections 462 and 463. The estimated SAT $T_{SAT}$ is inputted into the filter 450, and the influence of the $\tau_{SAT}$ is compensated by correcting the SAT $T_{SAT}$ in the filter 450. Therefore, it is necessary to set the $F_1(s)$ that achieves such a function.

Figure 9:
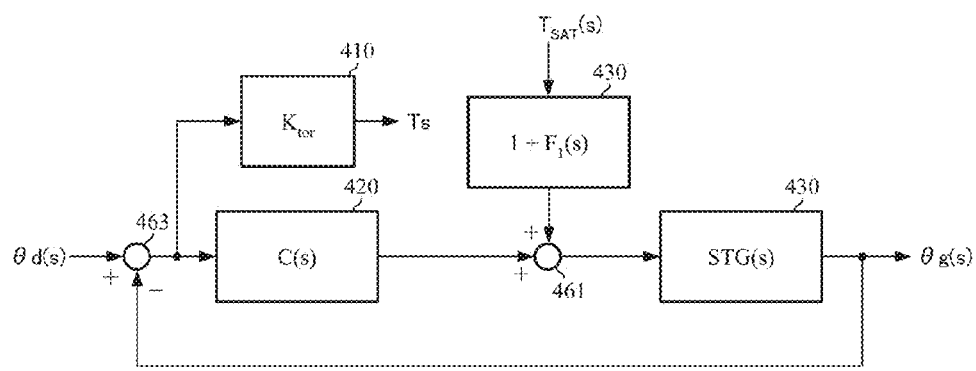
FIG. 9 is a block diagram showing a configuration in the case that an actual disturbance is equal to an estimation value of the disturbance observer in the configuration shown in FIG. 8.

Assuming that an actual disturbance is equal to an estimation value of the disturbance observer in FIG. 8, the $T_{SAT}$ works in such a manner as to pass the $T_{SAT}$ through a characteristic expressed by 1+F$_1$(s), as shown in FIG. 9. When the T$_{SAT}$ passed through the characteristic expressed by 1+F$_1$(s) becomes a characteristic having a desired time constant, it is possible to compensate the influence of the τ$_{SAT}$.

A transfer characteristic of the SAT T$_{SAT}$ to the steering angle θg is expressed by the following expression 15 when the damping factor of the yaw rate approximates 1.

$$T_{SAT} = G_{SAT} \frac{\tau_{SAT}s + 1}{\tau_r s + 1} \theta_g \quad \text{[Expression 15]}$$

G$_{SAT}$ is a SAT gain. In the case that a desired time constant is τ$_{SATR}$ and a desired SAT is T$_{SATR}$, the transfer characteristic of the SAT T$_{SAT}$ to the steering angle θg is expressed by the following expression 16.

$$T_{SATR} = G_{SAT} \frac{\tau_{SATR}s + 1}{\tau_r s + 1} \theta_g \quad \text{[Expression 16]}$$

When the relation as expressed by the following expression 17 is established between the T$_{SAT}$ and the T$_{SATR}$, the T$_{SAT}$ has a desired time constant, and it is possible to compensate the influence of the τ$_{SAT}$.

$$(1+F_1(s))T_{SAT} = T_{SATR} \quad \text{[Equation 7]}$$

In the case of obtaining the F$_1$(s) by substituting the expression 15 and the expression 16 for the expression 17 and setting ω$_{SAT}$=1/τ$_{SAT}$ and ω$_{SATR}$=1/τ$_{SATR}$, the F$_1$(s) is expressed by the following expression 18.

$$F_1(s) = \frac{\omega_{SAT} - \omega_{SATR}}{\omega_{SATR}} \frac{s}{s + \omega_{SAT}} \quad \text{[Expression 18]}$$

The SAT T$_{SAT}$ is corrected by using this F$_1$(s).

The SAT transfer characteristic control section 40 comprises the filter 450 and the adding section 460 that are enclosed with a broken line in FIG. 8. The filter 450 has the characteristic F$_1$(s) expressed by the expression 18, and transforms the SAT T$_{SAT}$ by using the characteristic F$_1$(s).

Finally, the disturbance sensitivity control section 50 will be described.

A purpose of the disturbance sensitivity control section 50 is to be capable of controlling the sensitivity of the prediction error of the vehicle track to the disturbance so as to be within an acceptable range of the driver. However, though the necessary information of the driving environment is included by the disturbance as described above, all cannot be suppressed. Moreover, since the information transfer relating to the vehicle behavior and the reduction of the sensitivity to the disturbance are in the relation of trade-off, it is necessary to keep balance between them. That leads to specifying the disturbance that should be suppressed and suppressing the disturbance individually depending on its characteristic.

The disturbances that the disturbance sensitivity control section 50 mainly suppresses are a disturbance by small-amplitude torque vibration (a small-amplitude disturbance), a disturbance excited at a resonance point in a longitudinal direction of a suspension (a resonance point disturbance), and a disturbance by a road cant (a cant disturbance).

Since the small-amplitude disturbance does not influence the followability to the target track and is not crucially important as the information of the driving environment, suppressing it enables reduction of a driver's load. Suppression by structural damping is effective in such a disturbance depending on an amplitude (an amplitude of the steering torque in the present embodiment). The structural damping is friction depending on an amplitude of force or a size of displacement, is sometimes called internal damping or hysteresis damping, and is observed on a Lissajous waveform as a hysteresis depending on the amplitude.

In order to achieve a friction characteristic depending on the amplitude of the steering torque by the electric power steering mechanism, the friction characteristic is given as a function of the SAT. To do so, at first, a structural damping model that should be applied will be described.

Since the structural damping is a damping that occurs by an energy loss occurring in a function of displacement that such a viscoelastic body as a rubber has, an imaginary number j is included to express a phase deviation between displacement and speed in the case of integrating a damping term (a damping factor) into a displacement term. When a natural frequency of the electric power steering mechanism is sufficiently large and stable, the structural damping model has a characteristic expressed by the following expression 19 using s=jω.

$$\frac{\theta_d}{T_{SAT}} = \frac{1}{(J_h + J_{STG})\omega^2 + K_{SAT} + j\eta K_{SAT}} \quad \text{[Expression 19]}$$

J$_h$ is a vibration parameter of steering wheel inertia, J$_{STG}$ is a vibration parameter of motor inertia, K$_{SAT}$ is a constant, and η is a structural damping coefficient. In the above expression 19, a structural damping term is expressed so as to be included by the displacement term.

Though jηK$_{SAT}$ has magnitude proportional to the steering angle θg, it means that a load works at timing when a phase is shifted by 90 degrees. Therefore, in order to implement the effect of the structural damping, a load whose amplitude is proportional to the θg can be provided for the damping being a function of a steering angular velocity (a differential value of the θg).

Figure 10:
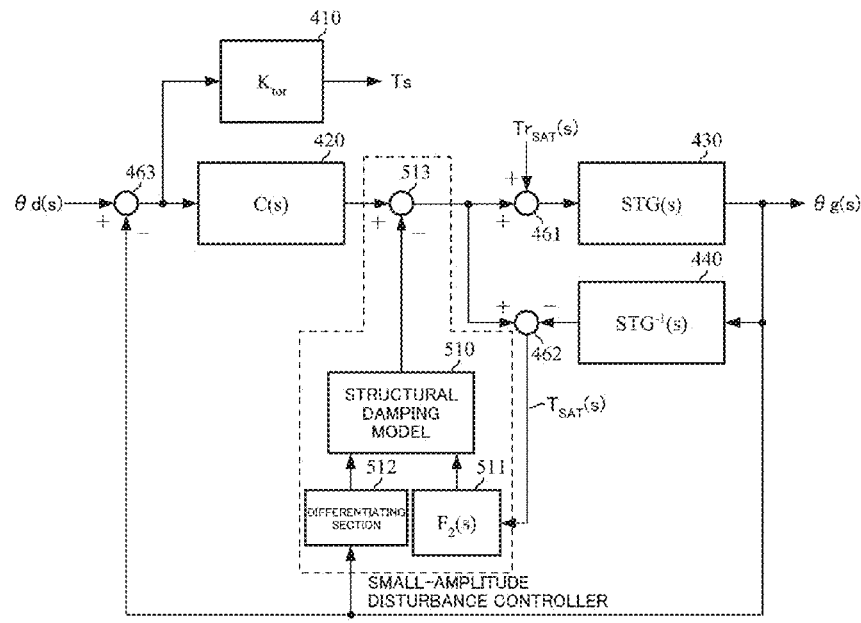
FIG. 10 is a block diagram in the case of achieving a small-amplitude disturbance controller by using a structural damping model.

Consequently, a block diagram of a configuration having the structural damping model is as shown in FIG. 10. In FIG. 10, F$_2$(s) is a filter characteristic. The configuration comprises the gain section 410 where the K$_{tor}$ is a gain, the characteristic section 420 having the C(s), the characteristic section 430 having the STG(s), the characteristic section 440 having the STG$^{-1}$(s), a structural damping model 510, a filter 511 having the F$_2$(s), a differentiating section 512, the adding section 461, and subtracting sections 462, 463 and 513. A controller for the small-amplitude disturbance (hereinafter referred to a "small-amplitude disturbance controller") in the disturbance sensitivity control section 50 comprises the structural damping model 510, the filter 511, the differentiating section 512, and the subtracting section 513 that are enclosed with a broken line in FIG. 10.

It is possible to use, for example, what is shown in the publication of Japanese Patent No. 46964572 B2 as a specific small-amplitude disturbance controller. An electric power steering apparatus described in this publication brakes a steering wheel returning that occurs by a road surface reaction force by multiplying the SAT by a positive or negative gain according to a judgment result of turning or returning a steering wheel and subtracting its signal from a current command value so that the steering wheel does not return excessively. The judgment of turning or returning the steering wheel is performed in a turning returning judging section by using a steering torque and an angular velocity, and the multiplication of the gain is performed in a gain section by inputting the SAT. Therefore, it is possible to suppress the small-amplitude disturbance using the method described in that publication by providing the structural damping model 510 shown in FIG. 10 with functions of the turning returning judging section and the gain section, and inputting the steering torque Ts in addition to a steering angular velocity ωg calculated by differentiating the steering angle θg in the differentiating section 512. In this case, though the filter 511 is unnecessary, it is possible to solve a problem that the steering wheel is rotated rapidly by too strong road surface reaction force by providing it with a function of a function transforming section described in that publication.

Moreover, it is possible to use a structural damping model other than what is described in the publication of Japanese Patent No. 46964572 B2 as the small-amplitude disturbance controller.

The resonance point in the longitudinal direction of the suspension where the resonance point disturbance is excited, is a resonance point that appears by coupling tire rigidity and/or bush rigidity of the suspension to a dynamic characteristic of a steering system. Conventionally, a tire shimmy and a brake judder that increase at resonance point in the longitudinal direction of the suspension like this, have been dealt with by adopting a bush having a damping characteristic as the bush of the suspension, or mounting a rubber on a sub-frame supporting the suspension. However, since these methods provides the steering system with extra compliance, a trade-off problem that the first condition and the second condition among the prediction enhancement conditions become worse arises. Therefore, the present embodiment suppresses the resonance point disturbance by using a disturbance observer. Since the tire shimmy and the brake judder are transmitted to the steering wheel through a steering mechanism, the present embodiment uses a disturbance observer that generates a vibration of opposite phase in a motor and offsets them.

Figure 11:
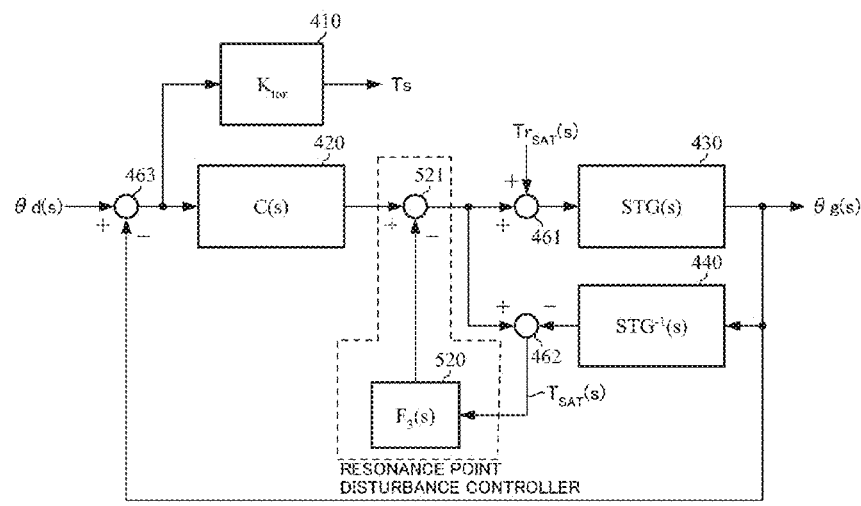
FIG. 11 is a block diagram showing a configuration in the case that a resonance point disturbance controller is a disturbance observer.

FIG. 11 is a block diagram in the case of configuring a controller for the resonance point disturbance (hereinafter referred to a "resonance point disturbance controller") as the disturbance observer. In FIG. 11, $F_3(s)$ is a filter characteristic. The configuration comprises the gain section 410 where the $K_{tor}$ is a gain, the characteristic section 420 having the C(s), the characteristic section 430 having the STG(s), the characteristic section 440 having the $STG^{-1}(s)$, a filter 520 having the $F_3(s)$, the adding section 461, and subtracting sections 462, 463 and 521.

Figure 12:
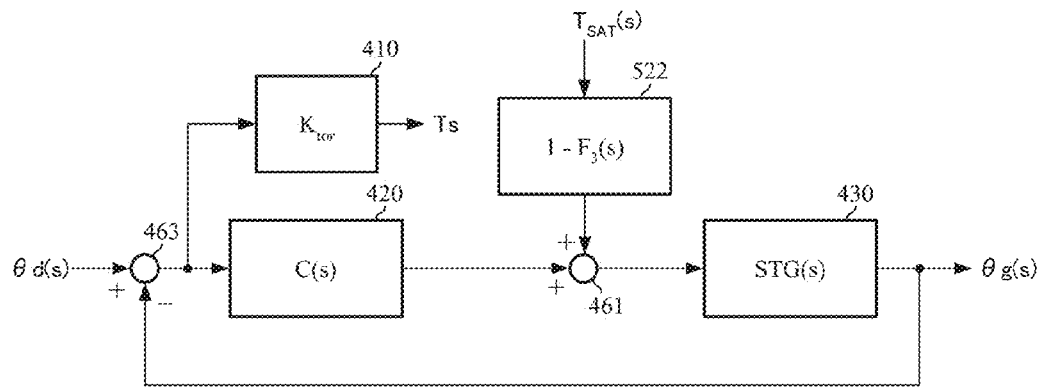
FIG. 12 is a block diagram showing a configuration in the case that an actual disturbance is equal to an estimation value of the disturbance observer in the configuration shown in FIG. 11.

As in the case of FIG. 8, assuming that the actual disturbance is equal to the estimation value of the disturbance observer in FIG. 11, the disturbance is transmitted through a filter 522 having a characteristic expressed by $1-F_3(s)$, as shown in FIG. 12. Therefore, the characteristic of the filter 522 is expressed by the following expression 20 where a model that offsets the resonance in the longitudinal direction of the suspension is a numerator and a characteristic after the offset is a denominator.

$$1 - F_3(s) = \frac{s^2 + 2\xi_2 \omega_{SUS} s + \omega_{SUS}^2}{s^2 + 2\xi_1 \omega_{SUS} s + \omega_{SUS}^2} \quad \text{[Expression 20]}$$

$\xi_1$ and $\xi_2$ are damping factors, and are set so as to satisfy $\xi_1 >> \xi_2$. $\omega_{SUS}$ is a resonance frequency in the longitudinal direction of the suspension, and is calculated by using the following expression 21.

$$\omega_{SUS} = \frac{V}{2\pi R} \quad \text{[Expression 21]}$$

R is a radius of a wheel.

From the expression 20, the characteristic $F_3(s)$ of the filter 520 is expressed by the following expression 22.

$$F_3(s) = 1 - \frac{s^2 + 2\xi_2 \omega_{SUS} s + \omega_{SUS}^2}{s^2 + 2\xi_1 \omega_{SUS} s + \omega_{SUS}^2} \quad \text{[Expression 22]}$$

The characteristic $F_3(s)$ expressed by the expression 22 is a band pass filter characteristic, and is understood to act so as to cancel a resonance peak.

The resonance point disturbance controller in the disturbance sensitivity control section 50 comprises the filter 520 and the subtracting section 521 that are enclosed with a broken line in FIG. 11. The filter 520 transforms the SAT $T_{SAT}$ by using the characteristic $F_3(s)$.

The cant disturbance is a stationary disturbance. The stationary disturbance means that the SAT occurring when a vehicle is in a straight running state is offset. Therefore, a controller for the cant disturbance (hereinafter referred to a "cant disturbance controller") is based on a configuration for detection of the straight running state of the vehicle and an offset correction of the SAT.

Figure 13:
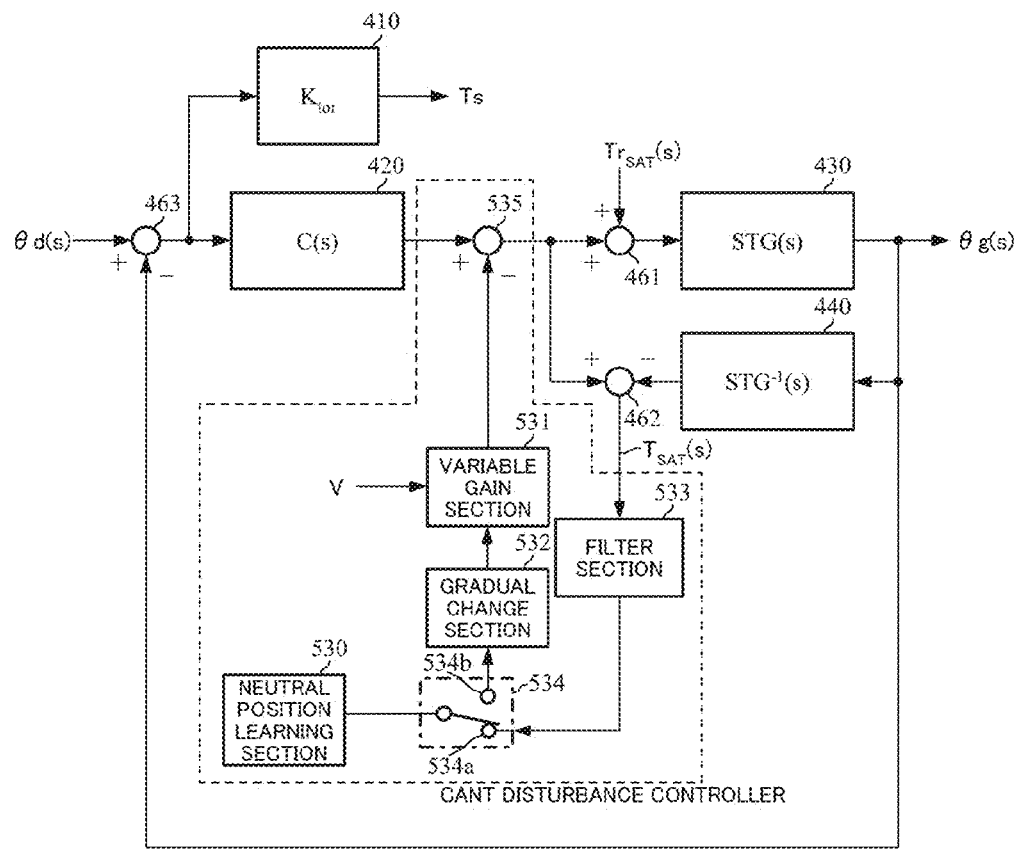
FIG. 13 is a block diagram showing a configuration comprising a cant disturbance controller

FIG. 13 is a block diagram showing a configuration comprising the cant disturbance controller. The configuration comprises the gain section 410 where the $K_{tor}$ is a gain, the characteristic section 420 having the C(s), the characteristic section 430 having the STG(s), the characteristic section 440 having the $STG^{-1}(s)$, a neutral position learning section 530 for neutral position learning, a variable gain section 531 that corrects an offset correction value depending on a vehicle speed, a gradual change section 532 that adjusts the correction so as to gradually perform it, a filter section 533 that transforms the SAT, a switch 534, the adding section 461, and subtracting sections 462, 463 and 535.

Since the cant disturbance controller compensates an influence of a lateral flow by a road cant, it calculates the offset correction value on the basis of the SAT occurring in the straight running state. In calculation of the offset correction value, at first, an offset correction value being a base (hereinafter referred to a "basic offset correction value") is calculated. After the calculation, an offset correction value that is ultimately used (hereinafter referred to an "ultimate offset correction value") is calculated by using the basic offset correction value. The basic offset correction value is calculated by using the SAT occurring in the straight running state during an arbitrarily set period (hereinafter referred to a "neutral position learning period"), for example, a predetermined period from a time point when the straight running state is detected. The SAT used for the calculation of the basic offset correction value is a SAT transformed in the filter section 533 (hereinafter referred to a "transformed SAT"). The filter section 533 suppresses disturbances superimposed on the SAT $T_{SAT}$ except the cant disturbance, for example, the small-amplitude disturbance, and the resonance point disturbance. Therefore, it is possible to use functions of the small-amplitude disturbance controller and the resonance point disturbance controller. The calculation of the basic offset correction value (the neutral position learning) is performed in the neutral position learning section 530. The neutral position learning section 530 makes the switch 534 connect with a contact 534a by sending a command or the like when entering the neutral position learning period, detects the straight running state by judging whether the steering wheel is located near the neutral position, and calculates the basic offset correction value by using the transformed SAT outputted from the filter section 533 when judging the straight running state. The neutral position learning section 530 uses known technology for detecting the straight running state, and uses, for example, a mean value of the transformed SAT as the basic offset correction value. The neutral position learning section 530 makes the switch 534 connect with a contact 534b by sending a command or the like when the neutral position learning period terminates. The calculated basic offset correction value is stored in the neutral position learning section 530. With respect to the basic offset correction value, it is possible to use a value other than the mean value such as a mode, or to use other statistical methods.

The basic offset correction value is transformed by using a vehicle speed correction function so as to be utilized even if the vehicle speed changes, and the correction is gradually performed in order to prevent uncomfortable feeling in the correction process. Since an offset amount of the SAT becomes a function of the vehicle speed in a vehicle having the understeer characteristic, it is expressed as a stationary gain $G_{SAT}$, which is expressed by using the two-wheel model, and is expressed by the following expression 23.

$$G_{SAT} = \frac{mL_f G_\alpha}{L} \quad \text{[Expression 23]}$$

$$G_\alpha = \frac{1}{1+KV^2} \frac{V^2}{L} \quad \text{[Expression 24]}$$

$$K = \frac{m}{2L^2} \frac{L_f K_f - L_r K_r}{K_f K_r} \quad \text{[Expression 25]}$$

This stationary gain $G_{SAT}$ is used to the vehicle speed correction function.

After the neutral position learning period terminates, the switch 534 connects with the contact 534b, and the gradual change section 532 inputs the basic offset correction value that has been stored in the neutral position learning section 530. In order to gradually perform the correction, for example, first, the gradual change section 532 outputs 1/N-fold (N is an arbitrary natural number) data of the basic offset correction value, and then outputs data that increase at such a constant rate as 2/N times and 3/N times (hereinafter processing in the gradual change section 532 is referred to "gradual change processing"). Needless to say, it is possible to use methods other than this, such as a method of gradually performing the correction like a quadratic function. The variable gain section 531 inputs the data outputted from the gradual change section 532, multiplies it by the stationary gain $G_{SAT}$ calculated by using the inputted vehicle speed V, and outputs the multiplication result as the ultimate offset correction value. When the multiplication result obtained by multiplication of the stationary gain $G_{SAT}$ exceeds a predetermined maximum value (for example, 3 Nm), the maximum value becomes the ultimate offset correction value.

The cant disturbance controller in the disturbance sensitivity control section 50 comprises the neutral position learning section 530, the variable gain section 531, the gradual change section 532, the filter section 533, the switch 534 and the subtracting section 535 that are enclosed with a broken line in FIG. 13.

Moreover, the disturbance sensitivity control section 50 may suppress disturbances other than the small-amplitude disturbance, the resonance point disturbance and the cant disturbance. For example, the disturbance sensitivity control section 50 may suppress an influence of a side wind as the disturbance. The disturbance sensitivity control section 50 suppresses track change of a vehicle corresponding to force provided for a vehicle body by the side wind, especially lateral displacement. In the case of suppressing the lateral displacement, the weak understeer characteristic is desirable. It is because the lateral displacement occurring once is returned by the phenomenon that the yaw rate slightly vibrates in the weak understeer characteristic. On the other hand, when the understeer characteristic appears strongly and the yaw rate vibrates, the danger occurs that a driver cannot take an appropriate and safe action. For this reason, it is said that the damping factor of the yaw rate is preferably about 0.8. The influence of the side wind is suppressed by using such a controller as achieves this damping factor.

Figure 14:
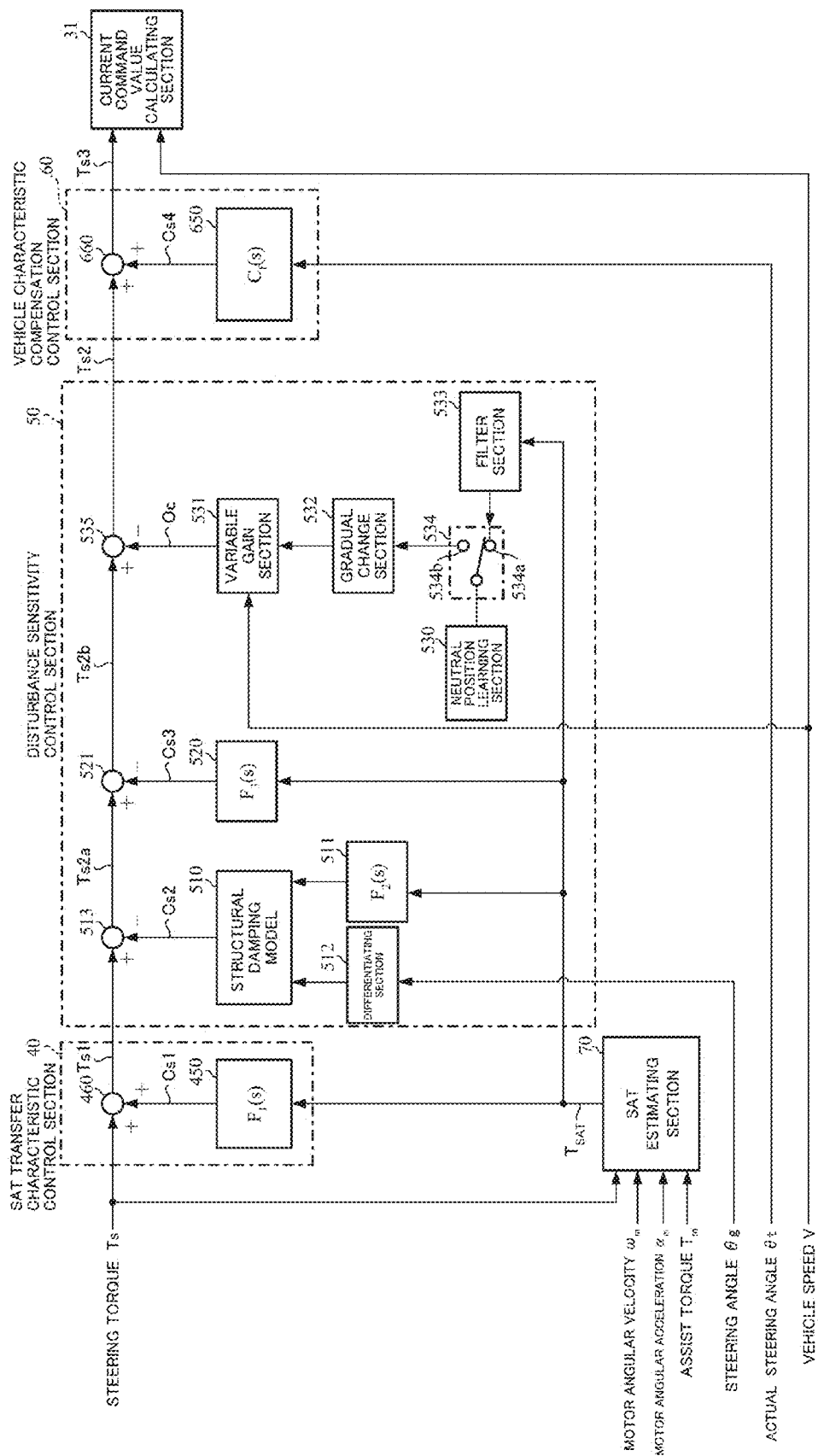
FIG. 14 is a block diagram showing a detailed configuration example of the present invention.

From the above explanation, the configuration example of the embodiment of the present invention shown in FIG. 4 becomes as shown in FIG. 14.

Figure 15:
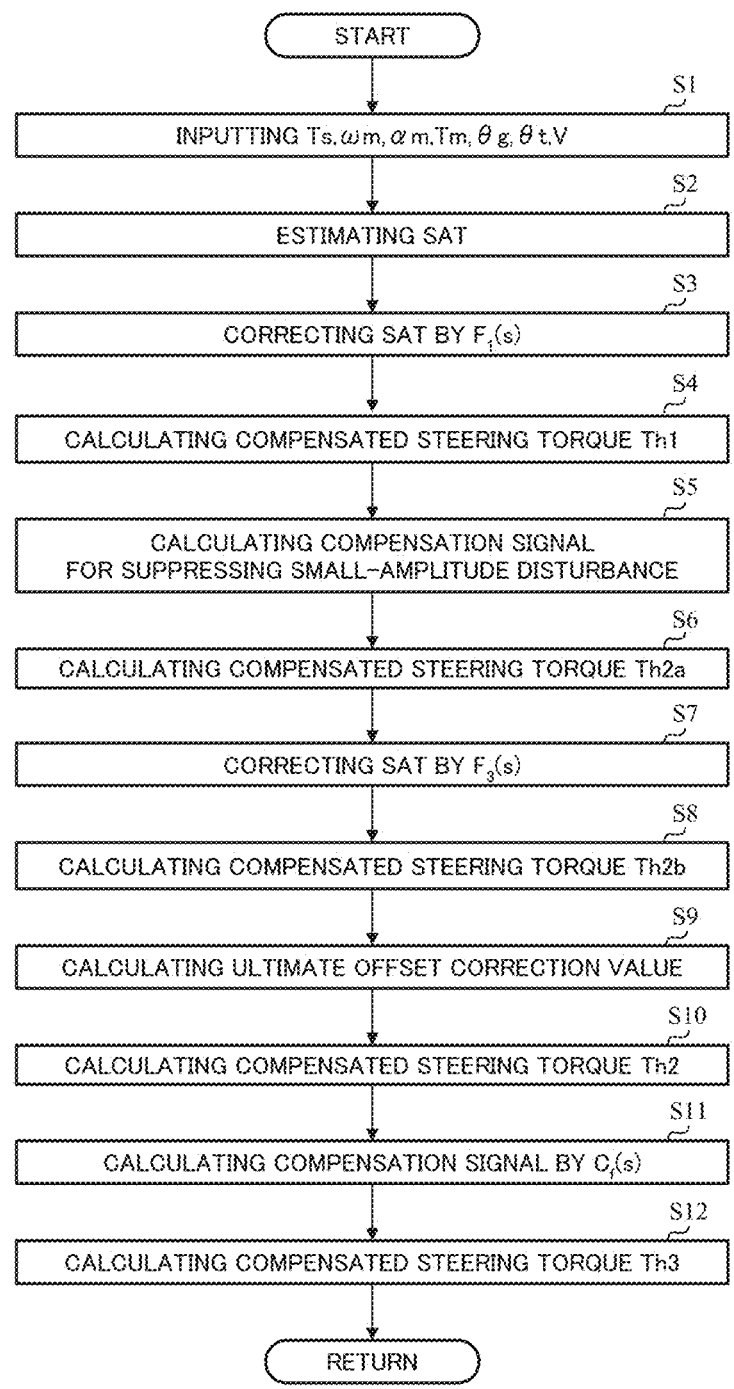
FIG. 15 is a flowchart showing an operating example of the present invention.

An operating example of the configuration shown in FIG. 14 will be described with reference to a flowchart shown in FIG. 15. It is supposed that the neutral position learning period set to the cant disturbance controller of the disturbance sensitivity control section 50 is the predetermined period (for example, 5 minutes) from the time point when the straight running state is detected, and in the following explanation of the operation, it is supposed that the neutral position learning section 530 has stored the mean value calculated by using the transformed SAT at a time point when the straight running state is judged among the transformed SATs inputted from the filter section 533 during the neutral position learning period as the basic offset correction value, and that the switch 534 has connected with the contact 534b.

When the operation is started, the steering torque Ts, the motor angular velocity ωm, the motor angular acceleration αm, the assist torque Tm, the steering angle θg, the actual steering angle θt, and the vehicle speed V are inputted (Step S1). Of these, the steering torque Ts is inputted into the adding section 460 and the SAT estimating section 70, the motor angular velocity ωm, the motor angular acceleration αm and the assist torque Tm are inputted into the SAT estimating section 70, the steering angle θg is inputted into the differentiating section 512 of the disturbance sensitivity control section 50, the actual steering angle θt is inputted into the characteristic section 650 of the vehicle characteristic compensation control section 60, and the vehicle speed V is inputted into the variable gain section 531 of the disturbance sensitivity control section 50 and the current command value calculating section 31. Moreover, the motor angular acceleration αm is calculated by differentiating the motor angular velocity ωm. Further, it is also possible to calculate the actual steering angle θt as θt=$g_{tot}$·θg using the steering angle θg.

The SAT estimating section 70 calculates the SAT $T_{SAT}$ on the basis of the expression 3 by using the steering torque Ts, the motor angular velocity ωm, the motor angular acceleration αm and the assist torque Tm (Step S2). The calculated SAT $T_{SAT}$ is inputted into the filter 450 of the SAT transfer characteristic control section 40, and the filter 511, the filter 520 and the filter section 533 of the disturbance sensitivity control section 50.

In the SAT transfer characteristic control section 40, the filter 450 corrects the SAT $T_{SAT}$ in accordance with the characteristic $F_1(s)$ expressed by the expression 18 (Step S3), and outputs a compensation signal Cs1 to the adding section 460. The adding section 460 adds the compensation signal Cs1 to the steering torque Ts, and outputs the compensated steering torque Ts1 (Step S4).

In the disturbance sensitivity control section 50, a compensation signal Cs2 for suppressing the small-amplitude disturbance is obtained by the structural damping model 510, the filter 511 and the differentiating section 512 of the small-amplitude disturbance controller using the SAT $T_{SAT}$ and the steering angle θg (moreover, the steering torque Ts in some cases) (Step S5). The compensation signal Cs2 is inputted into the subtracting section 513, the compensation signal Cs2 is subtracted from the compensated steering torque Ts1, and a compensated steering torque Ts2a is outputted (Step S6).

The filter 520 of the disturbance sensitivity control section 50 inputting the SAT $T_{SAT}$ corrects the SAT $T_{SAT}$ so as to suppress the resonance point disturbance in accordance with the characteristic $F_3(s)$ expressed by the expression 22 (Step S7), and outputs a compensation signal Cs3 to the subtracting section 521. The subtracting section 521 subtracts the compensation signal Cs3 from the compensated steering torque Ts2a, and outputs a compensated steering torque Ts2b (Step S8).

The gradual change section 532 and the variable gain section 531 of the disturbance sensitivity control section 50 calculate an ultimate offset correction value Oc for suppressing the cant disturbance by the gradual change processing, multiplication of the stationary gain $G_{SAT}$ and maximum value limitation using the basic offset correction value stored in the neutral position learning section 530 (Step S9). The ultimate offset correction value Oc is inputted into the subtracting section 535, the ultimate offset correction value Oc is subtracted from the compensated steering torque Ts2b, and the compensated steering torque Ts2 is outputted (Step S10).

The characteristic section 650 of the vehicle characteristic compensation control section 60 inputting the actual steering angle θt obtains a compensation signal Cs4 in accordance with the characteristic Cf(s) expressed by the expression 13 using the actual steering angle θt (Step S11). The compensation signal Cs4 is inputted into the adding section 660, the compensation signal Cs4 is added to the compensated steering torque Ts2, and the compensated steering torque Ts3 is outputted (Step S12).

The compensated steering torque Ts3 is inputted into the current command value calculating section 31.

Moreover, since the steering angle θg and a motor angle θm have the relation that the steering angle θg is proportional to the motor angle θm, it is possible to input the motor angle θm instead of the steering angle θg, and perform the differential after the differentiating section 512 calculates the steering angle θg from the motor angle θm as θg=G·θm (G is a constant). In this case, the motor angular velocity ωm is calculated by differentiating the motor angle θm.

In the above embodiment, though the vehicle characteristic compensation control section approximates the vehicle characteristic to the primary delay characteristic on the basis of providing the yaw rate with the damping, the vehicle characteristic compensation control section may approximates it to the primary delay characteristic by other methods.

Further, though the SAT transfer characteristic control section is configured as the disturbance observer, the SAT transfer characteristic control section may be configured as two-degree configurations other than it.

EXPLANATION OF REFERENCE NUMERALS

1 steering wheel
2 column shaft (steering shaft, handle shaft)
20 motor
30 control unit (ECU)
31 current command value calculating section
40 SAT transfer characteristic control section
50 disturbance sensitivity control section
60 vehicle characteristic compensation control section
70 SAT estimating section

The invention claimed is:

1. A driving support control apparatus using an electric power steering mechanism that calculates a current command value based on at least a steering torque, drives a motor based on said current command value, and assists and controls a steering system, comprising:
   a SAT estimating section that estimates a self-aligning torque;
   a SAT transfer characteristic control section that corrects said self-aligning torque in order to make a time constant of a self-aligning torque transfer characteristic equal to a desired value, compensates said steering torque in accordance with a corrected self-aligning torque, and outputs a compensated steering torque as a first compensated steering torque;
   a disturbance sensitivity control section that suppresses a disturbance included by said self-aligning torque, compensates said first compensated steering torque in accordance with a self-aligning torque obtained by suppressing said disturbance, and outputs a compensated first compensated steering torque as a second compensated steering torque; and
   a vehicle characteristic compensation control section that compensates said second compensated steering torque in accordance with an actual steering angle that is detected so that a vehicle characteristic from said actual steering angle to a yaw rate becomes a primary delay characteristic.

2. The driving support control apparatus using the electric power steering mechanism according to claim 1, wherein said vehicle characteristic compensation control section compensates said second compensated steering torque by using a characteristic Cf(s) providing said vehicle characteristic with damping, and said characteristic Cf(s) has been adjusted so that a damping factor of said yaw rate changing depending on a natural frequency of said electric power steering mechanism approximates a highest damping factor.

3. The driving support control apparatus using the electric power steering mechanism according to claim 2, wherein said characteristic Cf(s) has been adjusted so that said damping factor of said yaw rate is about 0.8 and a yaw rate natural frequency is between about 2 Hz and about 4 Hz.

4. The driving support control apparatus using the electric power steering mechanism according to claim 1, wherein said SAT transfer characteristic control section is configured as a disturbance observer.

5. The driving support control apparatus using the electric power steering mechanism according to claim 2, wherein
said SAT transfer characteristic control section is configured as a disturbance observer.

6. The driving support control apparatus using the electric power steering mechanism according to claim 3, wherein
said SAT transfer characteristic control section is configured as a disturbance observer.

7. The driving support control apparatus using the electric power steering mechanism according to claim 4, wherein
said SAT transfer characteristic control section compensates said steering torque by using a transfer characteristic defined by said desired time constant.

8. The driving support control apparatus using the electric power steering mechanism according to claim 5, wherein
said SAT transfer characteristic control section compensates said steering torque by using a transfer characteristic defined by said desired time constant.

9. The driving support control apparatus using the electric power steering mechanism according to claim 1, wherein
said disturbance sensitivity control section comprises a controller for each disturbance that is suppressed.

10. The driving support control apparatus using the electric power steering mechanism according to claim 2, wherein
said disturbance sensitivity control section comprises a controller for each disturbance that is suppressed.

11. The driving support control apparatus using the electric power steering mechanism according to claim 3, wherein
said disturbance sensitivity control section comprises a controller for each disturbance that is suppressed.

12. The driving support control apparatus using the electric power steering mechanism according to claim 4, wherein
said disturbance sensitivity control section comprises a controller for each disturbance that is suppressed.

13. The driving support control apparatus using the electric power steering mechanism according to claim 7, wherein
said disturbance sensitivity control section comprises a controller for each disturbance that is suppressed.

14. The driving support control apparatus using the electric power steering mechanism according to claim 9, wherein
one of said disturbances that said disturbance sensitivity control section suppresses is a small-amplitude disturbance occurring by a small-amplitude torque vibration, and said controller for said small-amplitude disturbance is configured as a structural damping model.

15. The driving support control apparatus using the electric power steering mechanism according to claim 10, wherein
one of said disturbances that said disturbance sensitivity control section suppresses is a small-amplitude disturbance occurring by a small-amplitude torque vibration, and said controller for said small-amplitude disturbance is configured as a structural damping model.

16. The driving support control apparatus using the electric power steering mechanism according to claim 9, wherein
one of said disturbances that said disturbance sensitivity control section suppresses is a resonance point disturbance excited at a resonance point in a longitudinal direction of a suspension, and said controller for said resonance point disturbance is configured as a disturbance observer.

17. The driving support control apparatus using the electric power steering mechanism according to claim 10, wherein
one of said disturbances that said disturbance sensitivity control section suppresses is a resonance point disturbance excited at a resonance point in a longitudinal direction of a suspension, and said controller for said resonance point disturbance is configured as a disturbance observer.

18. The driving support control apparatus using the electric power steering mechanism according to claim 9, wherein
one of said disturbances that said disturbance sensitivity control section suppresses is a cant disturbance occurring by a road cant, and said controller for said cant disturbance performs detection of a straight running state of a vehicle and a offset correction of said self-aligning torque.

19. The driving support control apparatus using the electric power steering mechanism according to claim 10, wherein
one of said disturbances that said disturbance sensitivity control section suppresses is a cant disturbance occurring by a road cant, and said controller for said cant disturbance performs detection of a straight running state of a vehicle and a offset correction of said self-aligning torque.

\* \* \* \* \*